March 25, 1958     D. BARNHARD     2,828,377
AUTOMATIC SWITCH FOR VEHICLE DIRECTIONAL SIGNALS
Filed March 27, 1956

INVENTOR.
DORN BARNHARD
BY Walter C. Kelsey
ATTORNEY

United States Patent Office 2,828,377
Patented Mar. 25, 1958

2,828,377
AUTOMATIC SWITCH FOR VEHICLE DIRECTIONAL SIGNALS

Dorn Barnhard, Cleveland Heights, Ohio

Application March 27, 1956, Serial No. 574,176

7 Claims. (Cl. 200—61.27)

This invention relates to improvements in directional signal switches adapted for use in connection with motor vehicles, and more particularly, to directional switches controlled automatically by certain parts of the steering mechanism of such vehicles. More specifically, it comprises a tilting switch device, such as a mercury switch attached to the pitman arm of the steering mechanism of the vehicle, or some other similarly functioning member.

Motor vehicles in use today are commonly provided with direction signal apparatus indicating that the vehicle is about to make a turn either to the right or to the left. Such apparatus in some instances is put into operation by the operator manipulating a hand control. In other instances, such mechanism is automatically operated by arms and linkage automatically controlled or set in operation by the movement of certain portions of the steering apparatus.

The type of signal apparatus automatically controlled by arms or linkage usually requires special forms of steering apparatus, and in some instances, where directional signal devices of the automatically controlled type are used, such devices usualy require the installation of several special parts, each designed for the specific vehicle on which it is used. The installation of such apparatus is a time-consuming and relatively expensive operation requiring specific installation and operational instructions for each make of vehicle.

I have discovered, by the invention herein described, that whenever the front wheels of the vehicle are turned substantially either to the right or to the left, a tilting switch attached to the pitman arm of the steering apparatus, provides a switch which is automatically operated and self-cancelled when the wheels of the vehicle are returned to the normal straight-ahead position.

Therefore, an object of this invention is to provide an automatic directional switch adapted to operate independently of or in cooperation with conventional manually operated directional signal systems.

Other objects are to provide vehicle directional switches adapted to be quickly and easily installed on the steering apparatus of various makes and designs of motor vehicles, such switches having no mechanical moving parts and being positive in action, instantly responsive to a turning movement of the vehicle, and thus are far superior to bi-metal blinkers, commonly used with manualy operated switches in which there is a perceptible delay between the time of operating a manual control and the initiation of the blinking operation.

Other objects are to provide an automatic signal device adapted to be used as a reminder to the vehicle operator to operate the manual directional control, such devices being adapted to be installed at a relatively low cost and readily installed by a simple clamping operation.

These and other objects of the invention will be apparent in the course of the following specification.

In the drawings, forming a part of this specification:

Fig. 4 is a similar view of a modified form of switch, while

Figure 1:
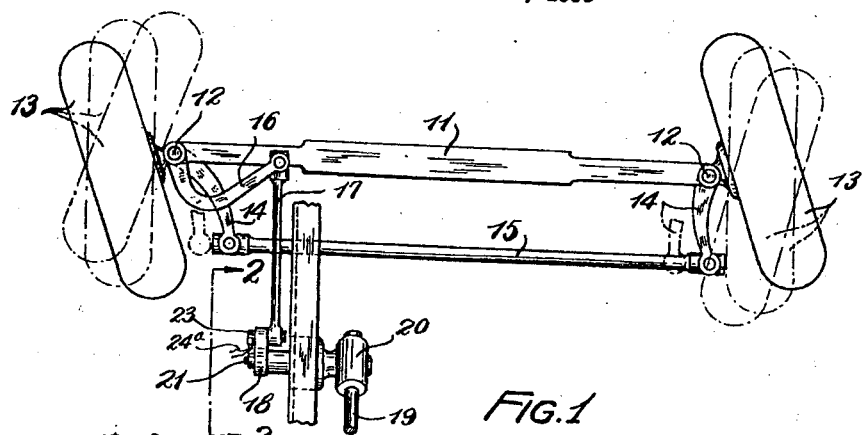
Fig. 1 is a fragmentary plan view of the front axle of a motor vehicle, with the different positions of the wheels and associated parts illustrated in broken lines, incorporating my automatic directional switch.

For the purposes of illustrating various embodiments of the invention, I have disclosed in the drawings the lower end of the steering tube, the front axle and steering mechanism of a motor vehicle. In the drawings, the numeral 11 indicates the front axle of a motor car mounting king pins 12 to which the front wheels 13 are operatively connected, while spindle arms 14 are connected to king pins 12 at one end to a tie rod 15. A steering knuckle 16 is operatively connected to a drag link 17 controlled by a pitman arm 18, which in turn is controlled by a steering tube 19 operating through cooperating worm shaft assembly 20 disposed and well known in the art at the lower end thereof, and a sector shaft roller assembly 21 to move pitman arm 18, all of the foregoing parts operating in a well known manner to cause a rotary movement imparted to the steering tube 19 by operating a vehicle steering wheel to cause the wheels 13 to turn to the right when the steering wheel is rotated in one direction, and to turn the wheels 13 to the left when it is rotated in the opposite direction.

Figure 2:
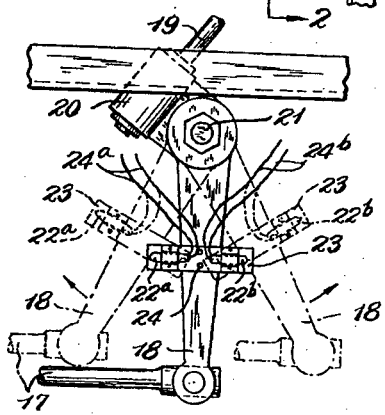
Fig. 2 is a sectional view taken on the line 2—2 of Fig. 1.

Various positions of the steering mechanism and resultant wheel positions are illustrated in Fig. 1, while Fig. 2 illustrates in full lines the position of the pitman arm 18 when the steering mechanism is retaining the wheels 13 in a straight position, the position the pitman arm 18 assumes when the wheel 13 are turned to the right or left, being illustrated by broken lines.

I have discovered that the rocking movements of the pitman arm 18 on a horizontal pivot may be used to operate a gravity or tilting switch mechanism, such as a mercury switch, positioned and arranged in such manner that, when the vehicle wheels are in straight position, no current is passed through such switch. However, when the front wheels are turned by operating the vehicle steering wheel, the tilting action of pitman arm 18 causes such switch mechanism to complete a circuit to a directional signal, conventionally mounted in a lamp disposed at the rear of the vehicle, which is usually a blinker light, and to cause a signal to be operated in the dash to appraise the driver of the operation of such signal. Such switch mechanism is arranged in connection with conduits and circuits so that movement of the pitman arm 18 in one direction completes the circuit to a signal on one side, while movement of such arm in the other direction completes the circuit to the signal in the other side of the vehicle.

Figure 3:
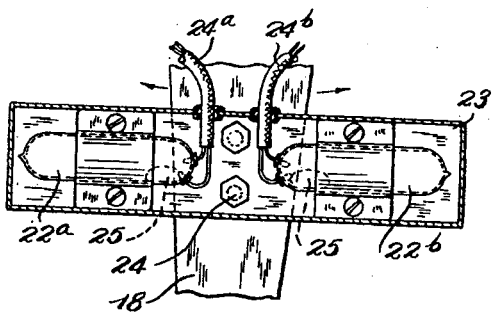
Fig. 3 is an enlarged sectional view of the switch illustrated in Fig. 2.

The switch mechanism illustrated in Figs. 2 and 3 comprises two similar mercury switches 22a and 22b mounted in a container 23, secured in horizontal position to the pitman arm 18 by means of bolts 24, while electric conductors 24a are adapted to connect mercury switch 22a to a directional light disposed, for example, on the left side of a vehicle and conductors 24b are adapted to connect switch 22b to a directional light at the opposite side. If desired, conductors may be provided leading from each of said switches 22a and 22b to a signal light on the dash or other suitable locations in the vehicle, to appraise the driver of the operation of the outside directional signals.

The mercury switches 22a and 22b are positioned and arranged in such manner that when the vehicle on which they are installed is traveling straight ahead, the pitman arm 18 is in a vertical position, as illustrated in full lines in Fig. 2, and such switches pass no current to the directional signals through to conductors 24a and 24b. However, when the pitman arm 18 is caused to assume one of the tilted positions illustrated in broken lines in Fig. 2, as the vehicle operator turns the steering wheel, causing the car to turn either left or right, the rocking of the switches 22a to the left, as shown in Fig. 2, causes the mercury 25 therein to close the circuit at the lower disposed end of the switch 22a, and to close the circuit leading to the directional signal on one side of the vehicle.

When the pitman arm 18 is moved to the right, the shifting of the mercury 25 therein causes the switch 22b to close a circuit leading to a directional light at the opposite side of the car. Thus, it will be seen that the movement of the pitman arm 18 in either direction, in steering the vehicle, will close circuits leading to directional signals disposed on the side of the vehicle corresponding to the direction of tilting of the pitman arm. Fully automatic means are provided for operating directional signals, which do not require the attention of the operator after they are installed. The size of mercury switch, as well as its specific construction and location for each installation can easily be determined as such switches can be readily adapted to operate in various positions. Such switch mechanisms are adapted to be encased in a suitable container and secured to the pitman arm or other suitable devices by bolting, clamping, or other readily operable means.

Figure 4:
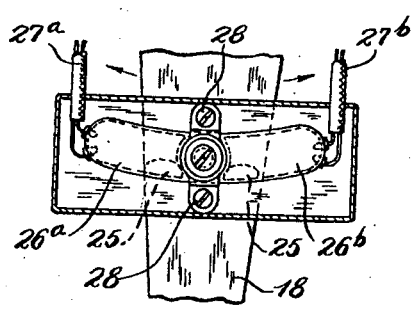
Figure 5:
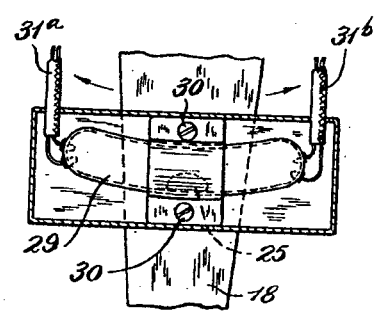
Fig. 5 is a similar view of a further modified form of this invention.

The mercury switch illustrated in Fig. 4 comprises two separated arcuate-shaped mercury switches 26a and 26b having conductors 27a and 27b leading therefrom to directional signals, such switches being similarly mounted on the pitman arm 18 by bolts 28. Fig. 5 illustrates a single arcuate mercury switch 29 similarly mounted on the pitman arm 18 by bolts 30 and adapted to conduct current to directional switches through conductors 31a and 31b.

The inventive thought underlying this invention includes mounting of gravity, rocking or tilting switches of various kinds on various moving parts of the vehicle, other than the pitman arm, as there are various types of steering, driving mechanisms and running mechanisms for vehicles adapted to perform the same function. For example, such switches might be mounted on the tie rod connecting the two front wheels. Various types of switches, automatically responsive to movements of other parts of vehicles might be used in certain instances with equal utility.

The switch mechanism herein disclosed is self-actuated and automatically terminated solely in response to car movements. This switch mechanism works instantaneously without any delay such as is inherent in the so-called blinker signals lights. Furthermore, my invention may be used in conjunction with, or independently of conventional directional signals and can be readily installed on various types of vehicles.

It will be apparent to those skilled in the art that the invention herein disclosed may be variously changed, used or modified without departing from the spirit of the invention, and that the present embodiment is illustrative only and that my invention is not limited thereto.

I claim:

1. Directional switch mechanism, for motor vehicles having steering means comprising a pitman steering arm mounted on a horizontal pivot and normally disposed in a vertical position when the vehicle wheels are directed straight ahead, said pitman arm swinging on said pivot in one direction from said vertical position when the vehicle wheels are turned to the right and swinging in the opposite direction from said position when said wheels are turned to the left, said switch mechanism comprising a removable container secured to said pitman arm, horizontally disposed mercury switch means mounted in said container, said switch means being provided with a pair of spaced electrical terminals at two spaced ends, one terminal of each pair being disposed above the other and each pair of terminals being connected to a pair of cooperating conductors connected to a separate directional signal, said mercury switch means being inoperative to complete a circuit through either pair of terminals when said pitman arm is in vertical position, whereupon swinging said pitman arm in one direction from its vertical position tilts said switch mechanism in one direction causing said mercury switch means to complete a circuit to one signal while tilting said pitman arm in the opposite direction completes a similar circuit to another signal.

2. Directional switch mechanism, for motor vehicles having steering means comprising a steering arm mounted on a horizontal pivot and normally disposed in a vertical position when the vehicle wheels are directed straight ahead, said arm swinging on said pivot in one direction from said vertical position when the vehicle wheels are turned to the right and swinging in the opposite direction from said position when said wheels are turned to the left, said switch mechanism comprising gravity-operated electrical switch means releasably mounted on said arm, said switch means including a pair of horizontally disposed switch tubes axially aligned, said tubes being provided with a pair of spaced electrical terminals at their inner disposed ends, one terminal of each pair being disposed above the other and each pair of terminals being electrically connected to a set of cooperating conductors leading to a separate directional signal, said switch tubes being normally disposed in a horizontal position and thereby being inoperative to complete a circuit through either pair of terminals when said pitman arm is in a vertical position, whereupon when said arm is swung in one direction from its vertical position, said tubes are tilted causing a circuit to be completed through the terminal end of one tube to one directional switch, while swinging said arm in the opposite direction causes a similar circuit to be completed through the other tube to another signal.

3. Directional switch mechanism, for motor vehicles having steering means comprising a pitman steering arm mounted on a horizontal pivot and normally disposed in a vertical position when the vehicle wheels are directed straight ahead, said pitman arm swinging on said pivot in one direction from said vertical position when the vehicle wheels are turned to the right and swinging in the opposite direction from said position when said wheels are turned to the left, said switch mechanism comprising a container releasably secured to said arm, mercury switch means mounted in said container, said switch means including a pair of horizontally disposed mercury-operated switch tubes aligned axially and mounted in said container and having their inner ends spaced apart a relatively short distance, said tubes being provided with a pair of spaced electrical terminals at their inner disposed ends, one terminal of each pair being disposed above the other and each pair of terminals being electrically connected to a set of cooperating conductors leading to a separate directional signal, said switch tubes being normally disposed in a horizontal position and inoperative to complete a circuit through either pair of terminals when said pitman steering arm is in a vertical position, whereupon said pitman arm is swung in one direction from its vertical position, said tubes are tilted causing a circuit to be completed through the terminal end of one tube to its cooperating directional switch, while swinging said arm in the opposite direction causes a similar circuit to be completed through the other tube to another signal.

4. Directional switch mechanism, for motor vehicles having steering means including a steering arm mounted on a horizontal pivot and normally disposed in a vertical position when the vehicle wheels are directed straight ahead, said arm swinging on said pivot in one direction from said vertical position when the vehicle wheels are turned to the right and swinging in the opposite direction from said position when said wheels are turned to the left, said switch mechanism comprising gravity-operated electrical switch means releasably mounted on said arm, said switch means including a pair of similarly curved switch tubes mounted horizontally endwise to each other and having their outer ends disposed upwardly of their inner ends, said tubes being provided with a pair of spaced electrical terminals at their outer ends, one terminal of each pair being disposed above the other and each pair of terminals being electrically connected to a set of cooperating conductors leading to a separate directional signal, said switch tubes being normally disposed in a generally horizontal position and inoperative to complete a circuit through either pair of terminals when said steering arm is in a vertical position, whereupon when said arm is swung in one direction from its vertical position, said tubes are tilted causing a circuit to be completed through the terminal end of one tube to one directional switch, while swinging said arm in the opposite direction causes a circuit to be completed through the other tube to another signal.

5. Directional switch mechanism, for motor vehicles having steering means including a pitman steering arm mounted on a horizontal pivot and normally disposed in a vertical position when the vehicle wheels are directed straight ahead, said arm swinging on said pivot in one direction from said vertical position when the vehicle wheels are turned to the right and swinging in the opposite direction from said position when said wheels are turned to the left, said switch mechanism comprising a container releasably secured to said arm, mercury switch means mounted in said container, said switch means including a pair of similarly curved elongated mercury-operated switch tubes mounted horizontally endwise to each other in said container and having their outer ends disposed above the inner ends, said tubes being provided with a pair of spaced electrical terminals at their outer ends, one terminal of each pair being disposed above the other and each pair of terminals being electrically connected to a set of cooperating conductors leading to a separate directional signal, said switch tubes being normally disposed in a generally horizontal position and inoperative to complete a circuit through either pair of terminals when said pitman arm is in a vertical position, whereupon when said pitman arm is swung in one direction from its vertical position, said tubes are tilted causing a circuit to be completed through the terminal end of one tube to one directional switch, while swinging said arm in the opposite direction causes a circuit to be completed through the other tube to another signal.

6. Directional switch mechanism, for motor vehicles having steering means comprising a steering arm mounted on a horizontal pivot and normally disposed in a vertical position when the vehicle wheels are directed straight ahead, said arm swinging on said pivot in one direction from said vertical position when the vehicle wheels are turned to the right and swinging in the opposite direction from said position when said wheels are turned to the left, said switch mechanism comprising gravity-operated electrical switch means mounted on said arm, said switch means including a single curved generally horizontally disposed switch tube having its outer ends disposed above its center portion, a pair of spaced electrical terminals at each end of said tube, one terminal of each pair being disposed above the other, each pair of terminals being electrically connected to a set of cooperating conductors leading to a separate directional signal, said switch tube thereby being inoperative to complete a circuit through either pair of terminals when said arm is in a vertical position, whereupon moving said arm in one direction from its vertical position tilts said tube in one direction causing a circuit to be completed through the terminals at one end of said tube to one terminal switch, while swinging said arm in the opposite direction causes a similar circuit to be completed through the other terminal end of said tube to another signal.

7. Directional switch mechanism, for motor vehicles having steering means comprising a pitman steering arm mounted on a horizontal pivot and normally disposed in a vertical position when the vehicle wheels are directed straight ahead, said pitman arm swinging on said pivot in one direction from said vertical position when the vehicle wheels are turned to the right and swinging in the opposite direction from said position when said wheels are turned to the left, said switch mechanism comprising a container releasably secured to said arm, mercury switch means mounted in said container, said switch means including a single curved generally horizontally disposed switch tube having its outer ends disposed above its center portion, a pair of spaced electrical terminals at each end of said tube, one terminal of each pair being disposed above the other, each pair of terminals being electrically connected to a set of cooperating conductors leading to a separate directional signal, said switch tube being disposed in a generally horizontal position and thereby being inoperative to complete a circuit through either pair of terminals when said pitman arm is in a vertical position, whereupon moving said pitman arm in one direction from its vertical position tilts said tube in one direction causing said mercury switch means to complete a circuit through the terminals at one end of said tube to one terminal switch, while swinging said pitman arm in the opposite direction causes a similar circuit to be completed through the other terminal end of said tube to another signal.

References Cited in the file of this patent
UNITED STATES PATENTS

| 1,843,825 | Lewis | Feb. 2, 1932 |
| 1,870,127 | Lewis | Aug. 2, 1932 |